United States Patent [19]

Sawano et al.

[11] 4,163,149

[45] Jul. 31, 1979

[54] AUTOMATIC FOCUSING APPARATUS

[75] Inventors: Susumu Sawano, Tachikawa, Japan; Yoshito Tsunoda, Stanford, Calif.; Takeshi Maeda, Kokubunji, Japan

[73] Assignee: Hitachi, Ltd., Japan

[21] Appl. No.: 819,861

[22] Filed: Jul. 28, 1977

[30] Foreign Application Priority Data

Jul. 28, 1976 [JP] Japan .................................. 51-89093
Aug. 9, 1976 [JP] Japan .................................. 51-94001

[51] Int. Cl.² .............................................. G01J 1/36;
[52] U.S. Cl. ..................................... 250/204; 358/128
[58] Field of Search ............... 250/201, 204, 208, 209, 250/570; 179/100.3 V 358 128

[56] References Cited

U.S. PATENT DOCUMENTS

| 4,051,527 | 9/1977 | Braat | 358/128 |
| 4,059,841 | 11/1977 | Bricot et al. | 250/201 |
| 4,065,786 | 12/1977 | Stewart | 179/100.3 V |

*Primary Examiner*—David C. Nelms
*Attorney, Agent, or Firm*—Craig and Antonelli

[57] ABSTRACT

In automatic focusing apparatus comprising a laser source, optical means for causing a light beam from the laser source to follow an information track on an information recorded medium, a photodetector which consists of quartered photodetection portions and to which a reflected light beam from the information track is guided through a cylindrical lens, and means for controlling the focusing of the light beam by the use of an error signal obtained from the shape and the intensity distribution of a light spot on the four photodetection portions, the improvement wherein a compensation signal is created from the absolute value of a difference between outputs from one set of the opposing photodetection portions and the absolute value of a difference between outputs from the other set of the opposing photodetection portions, to compensate for a disturbance ascribable to a movement of the light spot on the photodetector which arises in correspondence with the error signal.

14 Claims, 11 Drawing Figures

AUTOMATIC FOCUSING APPARATUS

BACKGROUND OF THE INVENTION

1. Field of the Invention

This invention relates to automatic focusing apparatus, and more particularly to an automatic focusing apparatus of the type which is suitable for optical video disks.

2. Description of the Prior Art

A generally-known field which requires automatic focusing relates to optical video disk play-back apparatus. Hereunder, therefore, this invention will be described by taking the automatic focusing in the optical video disk play-back apparatus as an example.

In order to play back information recorded on an optical video disk, it is necessary to cause a laser beam for play-back to precisely track an information track on the optical video disk and to focus the laser beam with high accuracy.

To this end, optical video disk play-back apparatus has heretofore employed a method wherein a light beam to be exclusively used for the tracking is generated separately from the light beam for the play-back of the video signals and a photodetector for detecting the tracking light beam is used for performing tracking control, and wherein a capacitance type detector, or an exclusive light beam and a corresponding photodetector, is/are employed for detection of focusing error so as to control the focusing. This method has the disadvantage that the construction of the apparatus becomes complicated.

In case where the use of a single light source is intended, as the employment of a plurality of light sources is expensive, it is necessary to form three light beams for the video signals, for the tracking and for the focusing. This brings about the disadvantage that the power of the single light source must be made very high.

On the other hand, there has been a method wherein a video signal and a focusing error signal are taken out with a single light beam. Herein, an optical element having a unidirectional lens action (hereinbelow, simply termed "cylindrical lens") is arranged in an optical system for detecting the video signal. By exploiting the astigmatic action of the light beam, a focusing error is detected in the form of changes in the shape of a reflected light beam and in the intensity distribution. The focusing control is conducted so that the intensity distribution of the reflected light beam may become constant.

This method is advantageous in that the apparatus is simple and, since the video signal and the focusing error signal are obtained with the single beam, the light source may be of low power. However, when the method is practically applied to an optical video disk play-back apparatus, it has the following disadvantage. Under the joint use with the tracking control and jitter control of the light beam as are indispensable to this sort of apparatus, the reflected light beam moves, and the movement becomes a disturbance to the focusing error signal, so that an accurate focusing control cannot be accomplished. As a result, the signal-to-noise ratio of the video play-back signal is low, and the play-back of a picture of high quality is impossible.

Referring now to FIGS. 1, 2, 3, 4A and 4B, description will be made of a typical prior-art apparatus and the disturbance which results in a problem in the functioning of the apparatus. FIG. 1 is a diagram for explaining the tracking control and the focusing control in a prior-art optical video disk play-back apparatus. In the figure, parts which are not relevant to the controls of the apparatus are omitted from the illustration. A light beam 30 emergent from a laser source (such as He-Ne laser) 10 passes through a condensing lens 11 and a beam splitter 12. After being reflected by a tracking mirror 13, the beam is converged on a point 31 on a video disk 22 as a convergent spot by a focusing objective lens 14. The video disk 22 is placed on a turntable 21, which is rotated at a constant speed by a motor 20. On the video disk 22, information tracks 23 bearing information relating to pictures, voices etc. are recorded at high density, which information is to be read with the convergent light spot.

At the convergent point 31 of the light beam, the convergent spot receives the information of the information track 23 in the form of changes in the reflection factor of the light. The reflected light returns to the objective lens 14 and the mirror 13, and it is separated from the entrance beam by the beam splitter 12. Then, the reflected light is guided to a photodetector 16 through a cylindrical lens 15. The light beam having reached the photodetector 16 becomes a detected spot 34. The output 40 of the photodector 16 includes, besides the video information read from the video disk 22, a signal relating to the converged state of the spot 31 of the light beam and a signal relating to the information tracking state of the beam. Therefore, the output 40 is separated into a focusing error signal 41, a tracking error signal 42 and the video information signal 43 by a signal distributor 17. The focusing error signal 41 is amplified by a focusing control amplifier 24, and the amplified signal is applied to a focusing control motor 25 to drive the objective lens 14 upwards or downwards, so that the focusing control of the spot 31 is accomplished. The tracking error signal 42, which turns the tracking mirror 13, is applied through a tracking control amplifier 26 to a motor 27, so that the tracking control of the spot 31 is accomplished. The video information 43 is applied to an amplifier 28, and is used for video play-back.

FIG. 2 shows the construction of a prior-art example of the photodetector 16 which forms the heart of the controls, including the detected spot 34 thereon, and the signal distributor 17. Owing to the action of unidirectional convergence of the cylindrical lens 15 placed in the path of the reflected light, the light spot 34 on the image of the photodetector 16 changes according to the change in the focusing image of the spot 31 on the video disk 22. At a correct focusing, the detected light spot becomes circular as indicated at 34. Accordingly, this focusing position is made the reference. When the video disk 22 comes close to the objective lens 14, the light spot is deformed as indicated at 34-1. On the other hand, when the video disk 22 moves away from the objective lens 14, the light spot is deformed as indicated at 34-2.

The photodetector 16 is quartered into individual photodetection portions having regions $D_1$, $D_2$, $D_3$ and $D_4$ formed by boundary lines 16-1 and 16-2. Signals are derived by the signal distributor 17 according to the shape into which the light spot 34 changes. Two adders 17-1 and 17-2 detect y-directional and x-directional components of the light spot, respectively. The focusing error signal 41 is evaluated by a summing amplifier 17-3.

Letting $e_F$ denote the focusing error signal, and $D_{1s}$, $D_{2s}$, $D_{3s}$ and $D_{4s}$ denote output signals of the respective photodetection portions $D_1$, $D_2$, $D_3$ and $D_4$, the following equation holds:

$$e_F = (D_{1s} + D_{2s}) - (D_{3s} + D_{4s}) \tag{1}$$

The focusing errors are accordingly detected as signals:

$$e_F > 0$$

when the video disk comes close, and $$e_F < 0$$

when the video disk moves away.

The signal distributor means 17 further includes circuits for deriving the tracking error signal 42 and the video information signal 43. An adder 17-4 evaluates the total signal of the light spot 34. The tracking error signal 42 is obtained by applying the total signal to a low-pass filter 17-5, while the video information 43 is obtained by applying it to a high-pass filter 17-6. These signals 42 and 43 are respectively used for the tracking control and the video play-back.

With the construction as stated above, the recorded information on the video disk 22 can be played back. Ordinary video disks, however, involve a tracking movement of 100 to 250 μm due to eccentricity etc., and a vertical movement of 100 to 500 μm because of the inclination of the turntable, the bowing and thickness variation of the video disk, etc. On the other hand, the video disk 22 has information recorded thereon along the information tracks 23 minutely with high density in the order of μm. In order to retrieve video information of good quality from such a video disk, the focusing of the spot 31 of the light beam and the tracking control of the spot to the information track must be at an accuracy of 1 μm or higher. Further, needless to say, the focusing control and the tracking control must precisely operate compatibly.

Nevertheless, the focusing control and the tracking control have hitherto been often devised individually and independently. In a practical case of jointly using both the controls, therefore, it has been feared that additional problems would arise. FIG. 3 is a schematic view illustrating problems in the case where the astigmatism type focusing control as illustrated in FIG. 1 is used jointly with the tracking control. A path 30-31-34 of a light beam as depicted by solid lines indicates the reference state under which the light beam passes through the centers of the lens and the mirror as in FIG. 1. Now, suppose the mirror 13 is moved to a position 13' by the tracking control and the light spot 31 on the video disk 22 is thereby moved to point 31'. At this time, the light beam proceeds along a path indicated by the dotted lines from the spot 31' via the lens 14, mirror 13' and beam splitter 12 to the cylindrical lens 15. The light beam which enters the cylindrical lens 15 has a shape such as indicated at 32' and is projected as a detected spot 34' on the photodetector 16, at a position deviating from the center of the photodetector 16. This is attributed to the fact that, by exploiting the astigmatism of the lens 15, the photodetector 16 is situated at a point which is not a focal position.

FIG. 4A is a diagram which shows the relationship between the photodetector 16 and the light spot in greater detail. It illustrates the case where the light spot is in focus on the disk 22. At this time, the detected spot 34 becomes a circle. As to the detected spot 34 in the case where the tracking control is in the reference state, the focusing error signal $e_F$ becomes:

$$e_F = 0$$

and a correct focusing error signal is obtained. However, as to the detected spot 34' in the case where the light spot has been moved by the tracking control, the focusing error signal $e_F$ has a finite value even when the light spot is in focus. Now, consider the areas of the light spot 34' in the photodetection portions $D_1$-$D_4$.

First, a straight line l passing through both the centers of the spots 34 and 34' is drawn. Subsequently, a circle 36' passing through the center of the spot 34 is depicted with its center at the center of the spot 34'. Auxiliary lines 38 and 39 are drawn in parallel with the boundary lines 16-1 and 16-2, respectively, so that they may pass through the point of intersection C between the circle 36' and the straight line l. The detected spot 34' divided by the auxiliary lines 38 and 39 (dotted lines) is reproduced in detail in FIG. 4B. In this figure, the sum between the area of an oblique line part of the spot 34' on the photodetection portion $D_3$ and the area of an oblique line part on the photodetection portion $D_4$ becomes equal to the area of an oblique line part of the detected spot 34' on the photodetection portion $D_1$. The area of that part of the spot 34' on the photodetection portion $D_3$ which is fully painted in black is equal to the area of that part of the detected spot 34' on the photodetection portion $D_2$ which is fully painted in black.

Accordingly, a signal corresponding to a rectangle 37 appears in the focusing error signal $e_F$ represented by Eq. (1), and the signal $e_F$ becomes:

$$e_F < 0$$

so that the correct focusing error signal is not produced. This indicates that the result of the tracking control has become a disturbance to the focusing control, and can be generally deemed one of the interaction problems in the multi-variable control.

The motion of the light spot 31 (shown in FIG. 3) due to the tracking control is a motion following a motion in the radial direction based mainly on the eccentricity of the information track. The motion of the detected spot on the photodetector as based on such motion of the light spot is a reciprocating motion on the x-axis. On the other hand, although omitted from FIGS. 1 and 3, a jitter control for compensating for a peripheral speed change of the information track is employed in association with the tracking control in the actual video disk play-back apparatus. In the jitter control, the light spot is oscillated in the circumferential direction orthogonal to the direction of the tracking control by means of another galvano-mirror. The motion of the detected spot on the photodetector as based on the oscillation becomes a reciprocating motion on the y-axis. Accordingly, the motion of the detected spot as based on a jitter correction is the reciprocating motion which shifts 90° in phase relative to the reciprocating motion based on the tracking control. Consequently, the combined motion of the detected spot as based on both the tracking and jitter controls is fundamentally a circular motion, and the center of the detected spot depicts a circle on the photodetector 16 as indicated at 36 in FIG. 4A.

The disturbance which develops due to the tracking control and the jitter control in spite of the fact that the light spot 31 or 31' on the video disk is in focus is designated $h_F$. Let it now be supposed that the intensity distribution of the detected spot is flat. Letting s denote the eccentric distance of the detected spot and $\theta$ denote the argument of the center of the detected spot as taken counterclockwise from the boundary line 16-1, the disturbance $h_F$ which is given by the area of the region 37 in FIG. 4A is represented by:

$$h_F = I_o(2s \sin \theta)(2s \cos \theta) = 2I_o s^2 \sin 2\theta \qquad (2)$$

where $I_o$ indicates the intensity of the detected spot. In practical use, the intensity distribution of the light spot is considered to be gaussian. In that case, $I_o$ becomes a function of s. However, in a range in which the eccentric distance s is small, $I_o$ is little dependent upon s and can be approximated by a constant. Letting $\omega$ denote the rotational frequency of the video disk and t denote the period of time, $$\theta = \omega t$$

Accordingly, $$h_F = 2I_o s^2 \sin 2\omega t \qquad (3)$$

Since the rotational frequency of an ordinary video disk is 30 Hz, the fundamental frequency of the disturbance $h_F$ is 60 Hz. Although the value of the eccentric distance s varies in dependence on the tracking error and the characteristics of the optical system, it becomes ¼ to ⅓ of the diameter of the light spot for a tracking error of 250 μm in an example, and hence, the disturbance $h_F$ becomes a considerably great signal. The prior-art focusing control illustrated in FIGS. 1 and 2 regards this disturbance as the focusing error and operates so as to make $e_F$ zero. As a result, therefore, defocusing is induced. In an example in which the prior-art method is applied, the defocusing ascribable to this disturbance becomes 2 to 5 μm, and it exceeds 0.5 to 1 μm which is the desired accuracy of the focusing control requested in the ordinary video disk play-back apparatus. Consequently, when this disturbance is allowed to stand, the video disk is played back by a light beam which becomes out of focus periodically, and only play-back pictures of low quality can be obtained. In order to acquire play-back pictures of high quality, it is necessary to compensate for the disturbance and to thus enhance the accuracy of the focusing control.

SUMMARY OF THE INVENTION

An object of this invention is to provide an automatic focusing apparatus of high accuracy for an optical video play-back system.

Another object of this invention is to provide in a system of the type described an automatic focusing apparatus of low cost.

In order to accomplish such objects, this invention consists of automatic focusing apparatus astigmatism wherein the absolute value of an output difference caused by a longitudinal change of the intensity distribution of a light spot on a photodetector consisting of a plurality of light receiving portions, and the absolute value of an output difference caused by a lateral change thereof are used to create a compensation signal for a focusing error signal.

DESCRIPTION OF THE PREFERRED EMBODIMENTS

Figure 1:
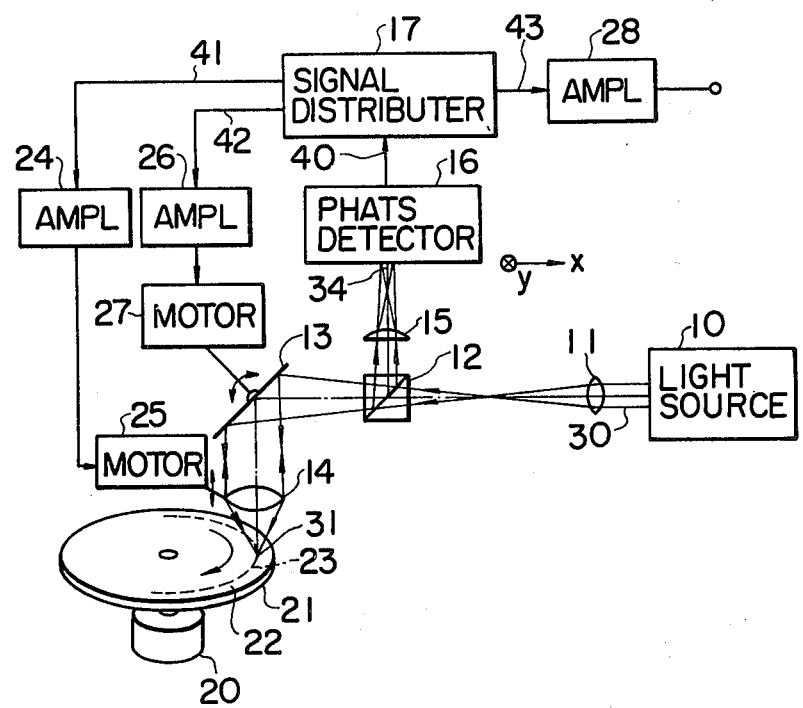
FIG. 1 is a schematic block diagram of a prior-art optical video disk play-back apparatus for explaining the tracking control and the focusing control.

Hereunder, the principle of this invention will be described.

The following equation (4) is based on the outputs $D_{1s}$, $D_{2s}$, $D_{3s}$ and $D_{4s}$ of the quartered photodetection portions $D_1$, $D_2$, $D_3$ and $D_4$ of the photodetector 16, respectively:

$$g = |D_{1s} - D_{2s}| - |D_{3s} - D_{4s}| \qquad (4)$$

In this relationship the function g is positive when the center 35 of the detected spot 34' lies at the detecting portion $D_1$ or $D_4$. The value of g corresponds to the area of a first part (hand drum-shaped part) of the detected spot 34' in FIG. 4A as defined by the lines 16-1 and 38. Therefore, the following function expression holds in approximation:

$$g = f(s) \sin 2\theta = f(s) \sin 2\omega t \qquad (5)$$

where f(s) represents the amplitude. While f(s) varies depending on the quantity of eccentricity s and the intensity distribution of the light spot, it can be approximated as follows in a range of small eccentricities as herein directed to.

$$f(s) \simeq k_a s^m \qquad (6)$$

Here, $k_a$ denotes a proportional constant, and m denotes an index which varies depending on the intensity distribution of the light spot, and $$m \simeq 1$$

when the intensity distribution is flat, $$m < 1$$

when it is convex upward (for example, gaussian) and $$m > 1$$

when it is convex downward.

Accordingly, when the approximation of Eq. (3) of the disturbance is expressed by raising f(s) in g of Eq. (5) to the n-th power and further multiplying the result by a coefficient k, $$h_F \approx h_F' = k \{f(s)\}^n \sin 2\omega t \qquad (7)$$

where $$k \approx (2 I_o/(k_a)^n)$$

and $$n = (2/m)$$

Although n varies according to m, it lies in a range of:

$$1 < n > 3$$

for almost all practical intensity distributions of the light spot. That is, when the amplitude $f(s)$ in g of Eq. (5) is raised to the n-th power and the result is multiplied by the coefficient k, the approximate function $h_F'$ of the disturbance $h_F$ is obtained.

By employing the above principle, this invention derives from the photodetector output signals a signal for compensating for the disturbance to the focusing control, thereby intending to enhance the precision of the focusing control.

Figure 2:
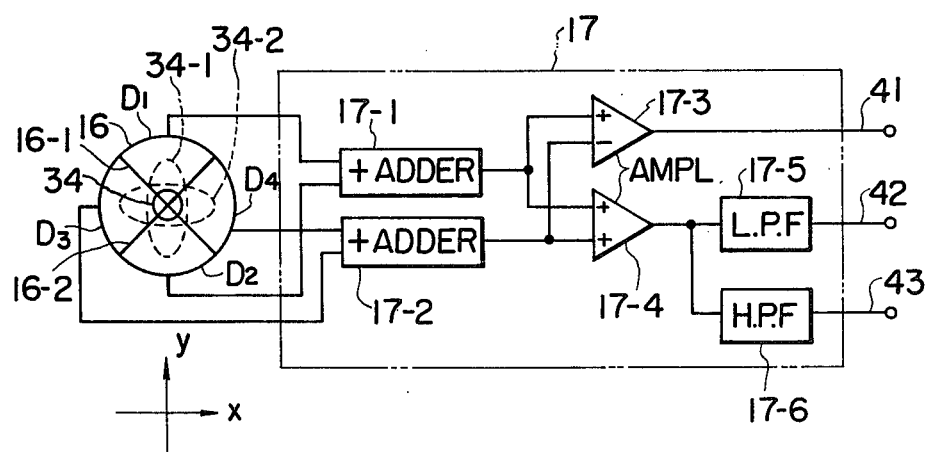
FIG. 2 is a schematic diagram showing a photodetector and a signal distributor which are used in the apparatus of FIG. 1.
Figure 3:
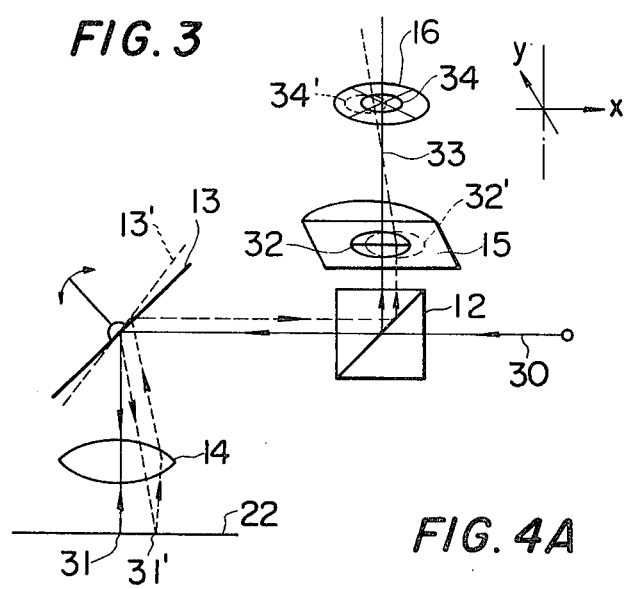
FIG. 3 is a schematic diagram showing the interaction between the tracking control and the focusing control which is used to better understand the principle of this invention.
Figure 5:
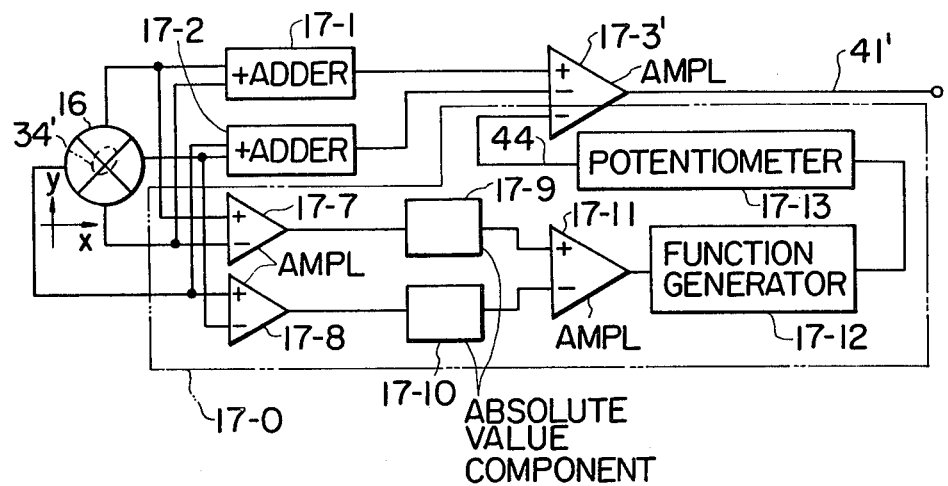
FIG. 5 is a block diagram of an embodiment of disturbance compensating means for the focusing control according to this invention.

FIG. 5 is a diagram showing the construction of an embodiment of this invention which has been made on the basis of the foregoing principle. The embodiment is an improvement on the construction shown in FIG. 2. A part 17-0 enclosed with a two-dot chain line in FIG. 5 is the means for compensating for the disturbance. In the figure, the means for separating the tracking error 42 and the video information 43 in FIG. 2 is omitted. Referring to FIG. 5, 17-7 and 17-8 designate summing amplifiers, which calculate the difference of the outputs of the photodetection portions $D_1$ and $D_2$ in the y-direction of the photodetector 16 and the difference of the outputs of the photodetection portions $D_3$ and $D_4$ in the x-direction, respectively. There is also provided a pair of absolute value components, 17-9 and 17-10 connected to respective inputs of a summing amplifier 17-11 the output of which represents the signal g of Eq. (4). A nonlinear function component 17-12 raises the amplitude f(s) of the signal g to the n-th power, the input/output characteristic of component 17-12 being shown in FIG. 6($a$). The output of the nonlinear function component 17-2 is multiplied by k by means of a potentiometer 17-13. Then, the disturbance compensation signal given by $h_F'$ of Eq. (7) is obtained. A summing amplifier 17-3' the summing amplifier 17-3 in FIG. 2 but is provided with one additional subtraction input. The disturbance compensation signal 44 is applied to the summing amplifier 17-3'. A signal 41' provided from the summing amplifier 17-3' is a disturbance-compensated focusing error signal $e_F'$ obtained in accordance with this invention.

$$e_F' = e_F - h_F' \qquad (8)$$

When this signal 41' is applied to the focusing control amplifier 24 in place of the focusing error signal 41 in FIG. 1, there can be achieved a focusing control of high accuracy which is almost free from influence by the tracking and jitter controls. The means required for realizing such disturbance compensation is the part 17-0 in FIG. 5 as stated previously, and the number of the constituent parts thereof is small, comprising the seven parts 17-7 to 17-13 in the described embodiment. In the specific construction described, the three summing amplifiers are common amplifiers, the absolute value component can be formed of an operational amplifier and a pair of diodes, and the nonlinear function component 17-12 can be formed of an operational amplifier and a nonlinear resistor or a diode function generator. All the components may therefore be conventional standard nonlinear elements of analog computers.

Figure 6A:
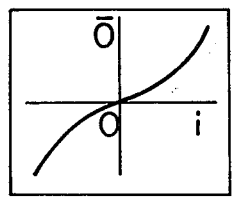
FIGS. 6A, 6B and 6C are diagrams showing examples of characteristics of nonlinear function components which are use for the disturbance compensating means of FIG. 5, and FIGS. 7 and 8 are block diagrams each showing the construction of another embodiment.
Figure 6B:
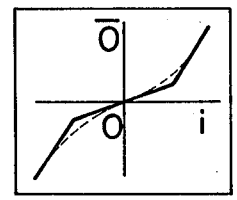
Figure 6C:
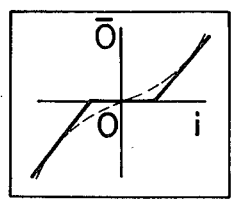

FIGS. 6B and 6C show further input/output characteristics of the nonlinear function component 17-12. In FIG. 6B, the n-th power function is approximated by two straight lines of different gradients. Although a component with this characteristic is somewhat low in accuracy, it is realized more simply than the previous characteristic. The characteristic of FIG. 6C has a dead zone factor. Although the accuracy of a component with this characteristic is the lowest as the n-th power approximation, the realization of the component is the simplest.

In the actual focusing control, the focusing depth of the objective lens exists, and hence, the disturbance compensation may be made only at a great disturbance in many cases. Therefore, the approximation of the nonlinear function may be so selected as to agree well in a range of great disturbances, and even a simple nonlinear function component will provide satisfactory disturbance compensation.

The nonlinear function component can be selected from among ones of the characteristics as shown in FIGS. 6A–6C in accordance with the required specifications of the whole play-back apparatus.

Regarding the embodiment shown in FIG. 5, description has been made of the case where the tracking mirror 13 carries out both the tracking compensation and the jitter compensation. It is a matter of course, however, that in the case where the tracking mirror 13 performs only tracking compensation, the disturbance compensation signal 44 is generated by only the summing amplifier 17-7, absolute value component 17-9, nonlinear function component 17-12 and potentiometer 17-13 in the embodiment shown in FIG. 5. In this case, even if the nonlinear function component 17-12 and the potentiometer 17-13 are omitted and the mere output from the absolute value component 17-9 is used as the disturbance compensation signal, play-back pictures of a quality which can withstand practical use are obtainable.

Furthermore, even if, in the case where the tracking mirror 13 performs both tracking compensation and jitter compensation, and the nonlinear function component 17-12 and the potentiometer 17-13 are omitted, play-back pictures of a quality which can withstand practical use are obtainable.

In the embodiment of FIG. 5, the nonlinear function component 17-12 is connected at the stage subsequent to the summing amplifier 17-11. Needless to say, however, a similar effect can be achieved even when it is connected at the stage prior or subsequent to the absolute value component 17-9 or 17-10.

According to the inventors' experiment, in the case of tracking at an amplitude of 200 μm, a disturbance signal corresponding to a defocusing of 5.5 μm was superposed on the focusing error signal in the prior-art automatic focusing apparatus shown in FIG. 2. In contrast, according to this invention, a disturbance corresponding to a slight defocusing of 1 μm is generated. This defocusing is of a magnitude within the focusing depth of the objective lens, and the automatic focusing control at high accuracy is realized.

Although, in the above, the case of obtaining the disturbance compensation signal by the use of absolute value components has been described, this invention is not restricted to such use but the disturbance compensation signal can also be obtained by squaring the differences of outputs from the quartered photodetection portions of the photodetector 16. Hereunder, description will be made of this principle and an embodiment of this invention relating thereto.

Now, the following equation (9) is evaluated from the output signals $D_{1s}$, $D_{2s}$, $D_{3s}$ and $D_{4s}$ of the quartered photodetection portions $D_1$, $D_2$, $D_3$ and $D_4$ of the photodetector 16:

$$f = (D_{1s} - D_{2s})^2 - (D_{3s} - D_{4s})^2 \quad (9)$$

f indicates signals corresponding to the situations of movements of the light spot 34', the value of which becomes positive when the center 35 of the detected spot 34' lies in the region $D_1$ or $D_2$ and negative when it lies in the region $D_3$ or $D_4$.

Eq. (9) can be reduced to the following equation (10):

$$f = f_1 \times f_2 \quad (10)$$

where $$f_1 = (D_{1s} - D_{2s}) + (D_{3s} - D_{4s})$$

$$f_2 = (D_{1s} - D_{2s}) - (D_{3s} - D_{4s})$$

Figure 4A:
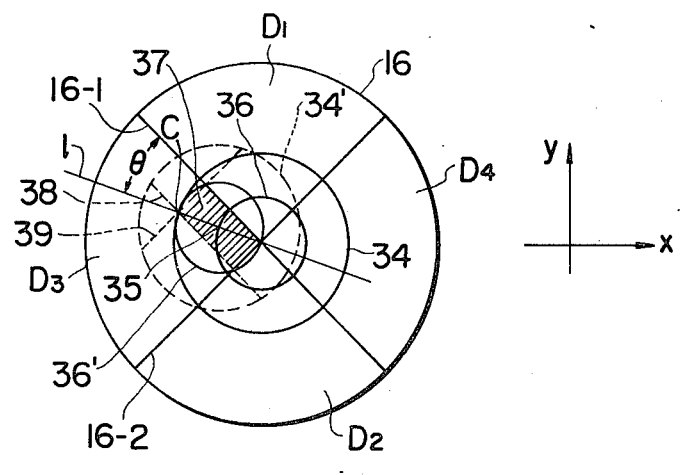
FIGS. 4A and 4B are diagrams for explaining in detail the disturbance of a focusing error signal ascribable to the interaction in FIG. 3.
Figure 4B:
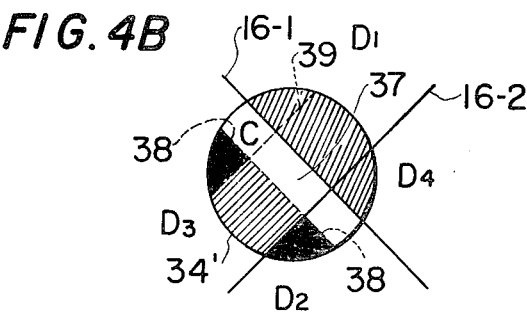

$f_1$ represents an output proportional to the area of the first part into which the detected spot 34' is restricted by the line 16-2 and the straight line 39 in FIG. 4A, while $f_2$ represents an output proportional to the area of the second part into which the detected spot 34' is restricted by the line 16-1 and the straight line 38 in FIG. 4A. Further, the argument $\theta$ is determined as stated above, and the radius of the detected spot 34' is denoted by $r_s$. Then, the area of the first part can be approximated to $2r_s \cdot 2S \sin \theta$, and the area of the second part can be approximated to $2r_s \cdot 2S \cos \theta$. Therefore, Eq. (9) becomes the following equation (11):

$$f \approx (2I_o r_s \cdot 2S \sin \theta)(2I_o r_s \cdot 2S \cos \theta) = 8(I_o r_s S)^2 \sin 2\theta = 8(I_o r_s S)^2 \sin \omega t \quad (11)$$

f given by Eq. (11) is very similar to the disturbance $h_F$ of Eq. (3). Accordingly, Eq. (3) is represented by the use of Eq. (11). Then, $$h_F = 2I_o S^2 \sin 2\omega t \approx k \cdot f \quad (12)$$

where $$k = (1/4 I_o r_s^2)$$

Since $I_o$ indicates the intensity of the detected spot as previously stated, it varies as follows according to the intensity distribution:

(a) When the intensity distribution is flat, $I_o$ is a constant.

(b) When the intensity distribution is convex upwards (for example, gaussian distribution), $I_o$ is a monotone decreasing function of the eccentricity S, that is, $I_o = \omega(1/x_r)$.

(c) When the intensity distribution is convex downwards, $I_o$ is a monotone increasing function of the eccentricity S, that is, $I_o = \omega(x_r)$.

However, in a practical range in which the eccentricity S is below ½ of the radius $r_s$ of the detected spot, $I_o$ can be regarded as a constant for almost all light spot intensity distributions in practical use. That is, the approximation that $k \approx k'$ holds where k' is the constant. Accordingly, by multiplying f by the constant coefficient K', Eq. (3) indicative of the disturbance can be approximated to the following equation (13):

$$h_F \approx k' f \quad (13)$$

Owing to the principle described above, this invention can obtain the signal for compensating for the disturbance to the focusing control, from the outputs of the photodetector.

Figure 7:
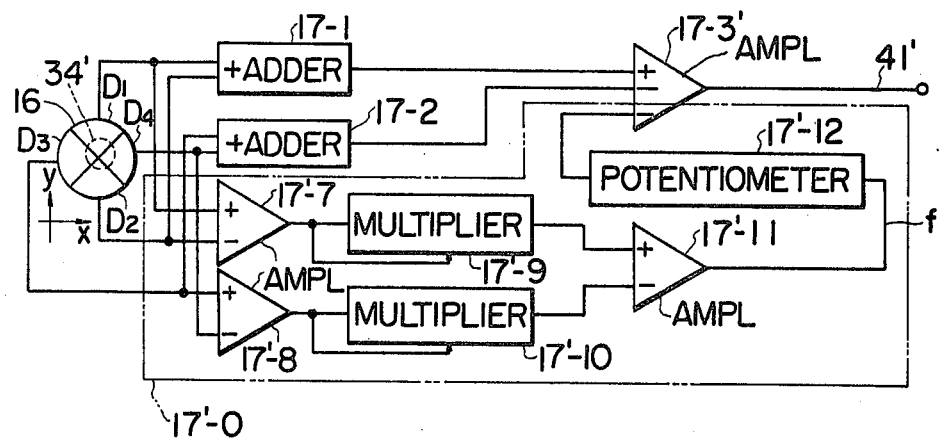

FIG. 7 is a diagram showing the construction of another embodiment of this invention. Like to the embodiment shown in FIG. 5, this embodiment is an improvement on the construction of FIG. 2. In FIG. 7, a part 17'-0 enclosed with a two-dot chain line is an example of a disturbance compensating means. Herein, as in FIG. 5, the circuit for separating the tracking error 42 and the video information 43 in FIG. 2 is omitted.

Referring to FIG. 7, summing amplifiers 17'-7 and 17'-8 calculate the difference of the outputs of the detection portions $D_1$ and $D_2$ in the y-direction of the photodetector 16 and the difference of the outputs of the detection portions $D_3$ and $D_4$ in the x-direction, respectively. Also multipliers 17'-9 and 17'-10 serve to square output signals of the summing amplifiers 17'-7 and 17'-8, respectively. A summing amplifier 17'-11 evaluates the difference between outputs of the multipliers 17'-9 and 17'-10, to produce the signal value f of Eq. (9).

An output of the summing amplifier 17'-11 is multiplied by k' by means of a potentiometer 17'-12, the resultant signal being the disturbance compensation signal $h_F'$. A summing amplifier 17-3' is the same as in FIG. 5, and has the disturbance compensation signal applied thereto.

A signal 41' thus evaluated is the disturbance-compensated focusing error signal $e_F'$.

$$e_F' = e_F - h_F' \quad (14)$$

When this signal 41' is applied to the focusing control amplifier 24 instead of the focusing error signal 41 in FIG. 1, there can be achieved a highly accurate focusing control which is almost free from the interactions due to the tracking and jitter controls.

Figure 8:
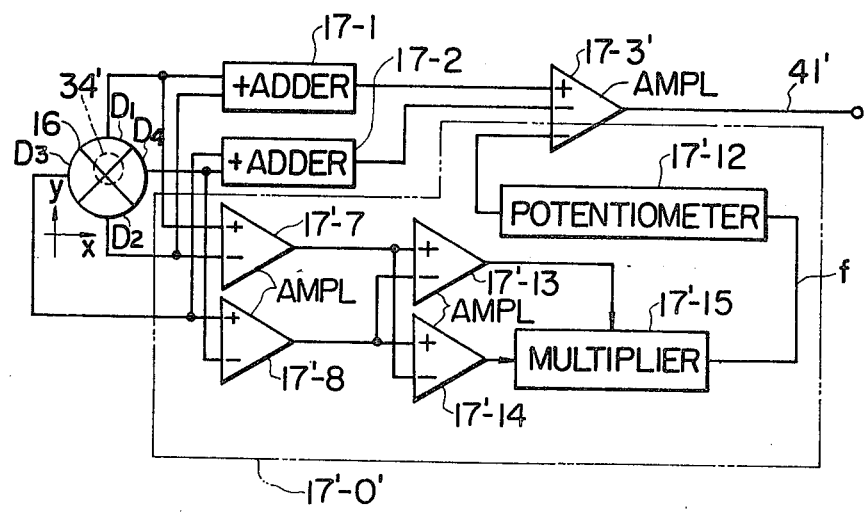

FIG. 8 shows a block diagram of still another embodiment of this invention. In the figure, a part 17'-0' is the disturbance compensating means. Outputs of summing amplifiers 17'-7 and 17'-8 are applied to further summing amplifiers 17'-13 and 17'-14, to evaluate the difference and sum of the difference outputs of the photodetection portions in the y- and x-directions of the photodetector 16. The product between the difference and sum is evaluated by a multiplier 17'-15.

The output of the multiplier 17'-15 has the value f satisfying the relation of Eq. (14). As in the case of FIG. 7, this output passes through a potentiometer 17'-12 and a summing amplifier 17-3', and a disturbance-compensated focusing error signal 41' is obtained.

By the means stated above, the disturbances gener-ated due to the tracking and jitter controls can be compensated for, and the provision of a focusing control having high precision becomes possible. Moreover, the means required for realizing the disturbance compensation is the part 17'-0 in FIG. 7 or the part 17'-0' in FIG. 8, and each of those embodiments is of very simple construction as in FIG. 5. More specifically, with the part 17'-0 in FIG. 7, the disturbance compensation can be realized by three summing amplifiers, a pair of multipliers, and a single potentiometer. With the part 17'-0' in FIG. 8, the disturbance compensation can be realized by four summing amplifiers, a single multiplier and a single potentiometer. The fundamental frequency of the disturbance is 60 Hz, and in general, it is satisfactory that the focusing control operates up to 600 Hz, which is ten times higher than the fundamental frequency. Accordingly, each arithmetic unit employing the disturbance compensating means may have flat gain and phase characteristics up to 600 Hz. It is needless to say that, by employing a variable potentiometer, such as a variable resistor, as the potentiometer 17'-12, re-adjustments are permitted against changes in the characteristics of the various portions of the apparatus, the practicability being enhanced. As any of the constituents, circuits which are generally and extensively employed as standard arithmetic elements of analog computers can be utilized, and the disturbance compensating means can be readily realized.

Of course, the construction for evaluating f of Eq. (9) need not be restricted to the specific embodiments of FIGS. 7 and 8, but any construction may be adopted if it evaluates f by performing operations equivalent to Eq. (9).

The embodiments are not restricted to the case of simultaneously carrying out both the tracking and jitter controls, but it is as in the embodiment of FIG. 5 that only the tracking control can be executed.

As set forth above, according to this invention, in the case where the astigmatism type focusing control is applied to a practical video disk play-back apparatus equipped with tracking control, jitter control, etc., disturbance compensating means is provided in the signal distributor means for the photodetector outputs, whereby the interferences of the tracking and jitter controls with the focusing control are removed, so that automatic focusing control at high accuracy becomes possible. Thus, a video disk play-back apparatus which is of low cost and which offers play-back pictures of excellent quality can be realized.

We claim:

1. In an optical recorded information playback apparatus having a light source for generating a light beam; an information recorded medium; a first optical system which converges said light beam from said light source onto said information recorded medium; a photodetector which consists of four photodetection portions arranged in orthogonal pairs for converting the light beam from said recorded medium into respective electric signals; a second optical system including at least an optical element having a unidirectional lens action for directing the light beam from said recorded medium to said photodetector; first means responsive to a focusing signal for controlling a defocusing of said first optical system; and second means responsive to the difference between the combined electric signals generated from one pair of the orthogonal photodetection portions opposing one another in a longitudinal direction and the combined electric signals from the other pair of the orthogonal photodetection portions opposing one another in a lateral direction for generating said focusing signal according to the shape of the spot of said light beam on said photodetection portions; the improvement comprising an automatic focusing compensating apparatus comprising third means for generating a compensation signal to compensate for a disturbance to the focusing signal in response to the difference between signals generated from the opposing pair of photodetection portions in at least one orthogonal direction and fourth means for applying said compensation signal to said second means to adjust the value of said focusing signal.

2. A play-back apparatus according to claim 1, wherein said third means for generating said compensation signal comprises means for generating a difference signal based on the influence difference between the outputs of one opposing set of photodetection portions and means for obtaining an absolute value of the difference signal.

3. A play-back apparatus according to claim 1, wherein said third means for generating said compensating signal comprises means for generating a difference signal based on the difference between the outputs of one opposing set of photodetection portions and means for obtaining a square value of the difference signal.

4. A play-back apparatus according to claim 2, wherein said third means for generating said compensating signal further includes nonlinear means for raising the absolute value to a power of predetermined value.

5. A play-back apparatus according to claim 3, wherein said third means for generating said compensating signal further includes a potentiometer for multiplying the square value by a predetermined value.

6. A play-back apparatus according to claim 1 wherein said third means for generating said compensation signal includes a first difference amplifier having respective inputs connected to one opposing pair of photodetection portions and first absolute value means connected to the output of said first difference amplifier.

7. A play-back apparatus according to claim 6 wherein said third means for generating said compensation signal further includes a second difference amplifier having respective inputs connected to a second opposing pair of photodetection portions, second absolute value means connected to the output of said second difference amplifier, and a third difference amplifier having respective inputs connected to said first and second absolute value means.

8. A play-back apparatus according to claim 7, wherein non-linear means for raising a signal value to a power of predetermined value is connected to the output of said third difference amplifier.

9. A play-back apparatus according to claim 8, wherein a potentiometer is connected between said non-linear means and said second means.

10. A play-back apparatus according to claim 6, wherein non-linear means for raising a signal value to a power of predetermined value is connected to receive the signal from said first absolute value means.

11. A play-back apparatus according to claim 1 wherein said means for generating said compensation signal includes first and second difference amplifiers each having respective inputs connected to a respective pair of photodetection portions and multiplier means for squaring the outputs of said first and second difference amplifiers.

12. A play-back apparatus according to claim 11 wherein a potentiometer is connected between said multiplier means and said second means.

13. A play-back apparatus according to claim 11 wherein said multiplier means includes third and fourth difference amplifiers each having respective inputs connected to the outputs of said first and second difference amplifiers and a multiplier connected to the outputs of said third and fourth difference amplifiers.

14. A play-back apparatus according to claim 11 wherein said multiplier means includes first and second multipliers, said first multiplier having a pair of inputs each connected to the output of said first difference amplifier and said second multiplier having a pair of inputs each connected to the output of said second difference amplifier, and a third difference amplifier having respective inputs connected to the outputs of said first and second multipliers.

* * * * *